United States Patent
Mizoguchi et al.

(10) Patent No.: US 6,875,815 B2
(45) Date of Patent: Apr. 5, 2005

(54) THERMOSETTING POWDER COATING COMPOSITION

(75) Inventors: Mitsuyuki Mizoguchi, Sodegaura (JP); Yoshiharu Hirose, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/445,830

(22) Filed: May 28, 2003

(65) Prior Publication Data

US 2003/0225217 A1 Dec. 4, 2003

(30) Foreign Application Priority Data

May 28, 2002 (JP) ........................................ 2002-154406

(51) Int. Cl.$^7$ .......................... C08F 8/00; C08L 25/02; C08L 37/00; C09D 133/14; C09D 163/00
(52) U.S. Cl. ...................... 525/193; 525/194; 525/206; 525/207; 525/208; 525/222; 525/241
(58) Field of Search ............................... 525/193, 194, 525/206, 207, 208, 222, 241

(56) References Cited

U.S. PATENT DOCUMENTS 6,084,009 A * 7/2000 Mizoguchi et al. ......... 523/201

FOREIGN PATENT DOCUMENTS

| JP | 9-291229 A | 11/1997 |
| JP | 2000-345076 A | 12/2000 |
| WO | WO 99/16838 A1 | 4/1999 |
| WO | WO 01/94463 A1 | 12/2001 |

OTHER PUBLICATIONS

Salitros, J.J. et al., "Gloss modification of thermoset powder coatings with styrene–maleic anhydride copolymers," Proceedings of the Waterborne, High–Solids, and Powder Coatings Symposium, pp 517–526, 1992, Chemical Abstracts Database Accession No. 117:132938 XP002254856.

* cited by examiner

Primary Examiner—Nathan M. Nutter
(74) Attorney, Agent, or Firm—Burns, Doane, Swecker & Mathis, LLP

(57) ABSTRACT

Disclosed is a thermosetting powder coating composition comprising (A) a glycidyl group-containing acrylic resin obtained by (co)polymerizing monomers containing an ethylenically unsaturated monomer having a glycidyl group and/or a β-methylglycidyl group, (B) a polycarboxyl curative, and (C) an alcohol adduct of a styrene/maleic anhydride copolymer. Also disclosed are a cross-linked cured film of the composition and a process for preparing the composition. According to the invention, blending efficiency and dispersibility of the components of a powder coating, particularly those between the resin component and the curative component, are improved without changing a conventional production process of a powder coating, i.e., a process consisting of melt blending, cooling solidification, pulverization and sieving, and thereby a thermosetting powder coating composition, which is capable of forming a cross-linked cured film improved in appearance properties (high gloss, etc.), physical properties (hardness, scratch/mar resistance, etc.), and chemical properties (acid resistance, solvent resistance, etc.), particularly in scratch/mar resistance and/or chemical properties, and having a 60° gloss value of not less than 80, and which is favorably used for coating of automotive bodies and automotive parts, can be provided.

17 Claims, No Drawings

THERMOSETTING POWDER COATING COMPOSITION

FIELD OF THE INVENTION

The present invention relates to a thermosetting powder coating composition. More particularly, the present invention relates to a thermosetting powder coating resin composition, especially an acrylic powder coating composition, which is capable of forming a cross-linked cured film having excellent appearance properties (high gloss, etc.), physical properties (hardness, scratch/mar resistance, etc.) and chemical properties (acid resistance, solvent resistance, etc.), particularly having improved scratch/mar resistance and chemical properties, and which is favorably used for coating of automotive bodies and automotive parts.

BACKGROUND OF THE INVENTION

Thermosetting powder coatings are environmentally friendly paints with extremely small quantity of solvent emission, and their market has been extended particularly in Europe and the U.S. where the VOC (Volatile Organic Compound) emission is strictly regulated.

The thermosetting powder coatings are broadly classified into four groups of polyester powder coatings, epoxy powder coatings, polyester/epoxy hybrid powder coatings and acrylic powder coatings, and their markets have been developed for various uses according to their prices and performance. Of these powder coatings, the acrylic powder coatings are generally used as decorative coatings assumed to be used outdoors as automotive exterior coatings or the like, making the most of high transparency and out-door-durability (weatherability) inherent in the acrylic resin.

In case of the automotive exterior coatings, the resulting cross-linked cured films are required to have various excellent properties in addition to high gloss. For example, resistance to scratches (marring) caused by car washing brush, sand, or dust, properties of being not etched chemically by acid rain (acid resistance), and properties of being not damaged by organic solvents such as gasoline (solvent resistance) are important. In these typical properties, the acrylic powder coatings are not always superior to the solvent-borne acrylic paints conventionally used. Particularly, improvement of scratch/mar resistance and the chemical properties was a serious problem.

Regarding the improvement of scratch/mar resistance and/or chemical properties of the coating films obtained from the acrylic powder coatings, various studies have been made centering around the thermosetting powder coatings comprising a glycidyl group-containing acrylic resin and a polycarboxyl curative. The reason is that this combination (combination of a glycidyl group-containing acrylic resin and a polycarboxyl curative) is likely to form a smooth and high-gloss coating film and the curing system of glycidyl group/carboxyl group is inherently excellent in the acid resistance.

The approaches, which have heretofore been made for improving scratch/mar resistance and/or chemical properties, are broadly classified into three groups That is to say, the first approach is a method of enhancing the cross-linking density of the coating film by selecting a specific curative, the second approach is a method of enhancing relatively the mechanical strength of the coating film by, for example, adding specific hard particles as additives, and the third approach is a method of imparting special functions, such as slipping function, hyper-hydrophoboic character, to the surface of the coating film by, for example, modifying the glycidyl group-containing acrylic resin.

The method of enhancing cross-linking density of the coating film by selecting a specific curative, which is the first method to improve scratch/mar resistance and/or chemical properties, is described in, for example, EP696622 (publication (A)), and in the publication (A), an aliphatic dibasic acid curative and a linear polyacid anhydride curative obtained by dehydrocondensation of the dibasic acid curative are used in combination. In this publication, acid anhydride groups in a linear polyacid anhydride curative can give new branching points in the thermosetting reaction with glycidyl groups in the glycidyl group-containing resin, whereby enhancement of cross-linking density is achieved. In Japanese Patent Laid-Open Publication No. 137083/1997 (publication (B)), a bi- or trifunctional carboxyl curative obtained by the reaction of TGIC (triglycidyl isocyanurate) with dodecanedioic acid is used to achieve enhancement of cross-linking density.

In the method of enhancing the mechanical strength of the coating film by adding specific hard particles as additives, which is the second method to improve scratch/mar resistance and/or chemical properties, the type of the powder coating is not specifically restricted. For example, in EP853095 (publication (C)), α-alumina fine particles having an average particle diameter of not more than 5.5 microns are added as additives, and in DE19857316, nano-scale ceramic fine particles having an average particle diameter of not more than 100 nanometers are added as additives. In either case, the mechanical strength of the coating film is relatively enhanced.

The third method to improve scratch/mar resistance and/or chemical properties is a method of imparting special functions, such as slipping function, hyper-hydrophoboic character, to the surface of the coating film by, for example, modifying the glycidyl group-containing acrylic resin.

Such a method is described in, for example, Japanese Patent Laid-Open Publication No. 2311894/1996 (publication (D)) and WO9515347 (publication (E)). In these publications, a silicone type macromonomer is copolymerized as an ethylenically unsaturated monomer for constituting the glycidyl group-containing acrylic resin. In EP897962 (publication (F)), glycidyl groups in the glycidyl group-containing acrylic resin are partially modified with a silicone polymer having a functional group.

Although the above methods all contribute to the improvement of scratch/mar resistance and/or chemical properties of the coating film, they still have many problems to be solved in the practical use and are not satisfactory.

Then, the present inventors have earnestly studied a fourth approach different from any of the above methods on the assumption that if the completeness of the thermosetting reaction between a glycidyl group-containing acrylic resin and a polycarboxyl curative is enhanced as highly as possible by improving the mutual solubility or dispersibility of these components for constituting the thermosetting powder coating, a cured film remarkably excellent in the scratch/mar resistance and/or the chemical properties is obtained.

The reasons are described below in detail. Powder coatings are generally prepared by mechanically melt blending a resin component, which is a main binder resin being solid at room temperature, with a curative component, which is also solid at room temperature, and appropriate additives by an extrusion blending machine (extruder) or the like in a molten state and then subjecting the blend to cooling solidification, pulverization and sieving. The meld blending operation is usually carried out under the conditions of such temperature and residence time as bring about substantially no premature thermal curing reaction, and in case of, for example, acrylic powder coatings, the melt blending operation is carried out at a temperature of usually 60 to 130° C. However, it is thought that in this temperature range, a blending or dispersion state up to the molecular level is not reached, because all of the resin component, the curative component, and the additive component are not necessarily melted completely, and the difference of melt viscosity of these raw materials can not necessarily allow the homogeneity in the melt blend. Furthermore, although the dry blending operation with mechanical crashing is generally done in advance to help the homogeneous melt blending of all of the resin component, the curative component, and the additive component, the mechanical crashing of acrylic resin is apt to give low bulk density of the dry blend, which causes too low shear stress in the extrusion blending machines to get homogeneous melt blend due to low packing efficiency. Therefore, the acrylic thermosetting powder coating compositions typically comprising of glycidyl-group containing acrylic resins and polycarboxyl curatives are very difficult to be homogeneous compound or the melt blend. Actually, according to the data of the inventors, scratch/mar resistance and/or chemical properties of the coating film can be generally improved by only heighten the baking temperature. This fact indirectly supports the possibility in the above assumption that the completeness of the thermosetting reaction between a glycidyl group-containing acrylic resin and a polycarboxyl curative can be enhanced by improving the mutual solubility or dispersibility of these components for constituting the thermosetting powder coating.

On the other hand, in case of the solvent-borne acrylic paints, the resin component and the curative component can be easily blended and dispersed to the molecular level by the use of an organic solvent, though there is a problem of regulation of VOC emission. For this reason, the coating film obtained from the acrylic thermosetting powder coating is thought to be inferior to the coating film obtained from the acrylic thermosetting solvent-borne paint in the film properties such as scratch/mar resistance and/or chemical properties.

An approach to improve the blending or dispersion state of the resin component and the curative component from the viewpoint of thermosetting powder coating production process is, for example, a method comprising completely dissolving the components by the use of tertiary butanol capable of dissolving both of the resin component and the curative component and then removing the tertiary butanol by freeze drying, as described in GB2326883 (publication (G)). Further, in U.S. Pat. No. 6,114,414 (publication (H)) and WO9534606 (publication (I)), an inert fluid in a supercritical state is used as a solvent medium for promoting blending and dispersing. In Japanese Patent Laid-Open Publication No. 192604/2001 (publication (J)), a method comprising melt blending the components in the presence of an organic solvent and recovering the solvent simultaneously with the melt blending by means of a pressure reducing device equipped in an extruder is proposed. These techniques can be all expected to exert great effects, but they are accompanied by changes of the production process or apparatuses, so that it is hardly to say that they are practically used at present.

Under such circumstances as mentioned above, the present inventors have further studied earnestly, and as a result, they have found that the blending efficiency and dispersibility of the components, particularly those between the glycidyl group-containing acrylic resin and the polycarboxyl curative, can be remarkably improved by the use an alcohol adduct of a styrene/maleic anhydride copolymer as a dispersion promoter in the acrylic powder coatings comprising the glycidyl group-containing acrylic resin and the polycarboxyl curative, without changing the conventional production process of a powder coating, and a cross-linked cured film obtained from the composition can be remarkably improved in appearance properties (high gloss, etc.), physical properties (hardness, scratch/mar resistance, etc.) and chemical properties (acid resistance, solvent resistance, etc.), particularly in scratch/mar resistance and chemical properties. Based on the finding, the present invention has been accomplished.

OBJECT OF THE INVENTION

The present invention is intended to solve such problems associated with the prior art as described above, and it is an object of the invention to provide a thermosetting powder coating composition, which is improved in blending efficiency and dispersibility of the components for constituting a powder coating, particularly those between the resin component and the curative component, without changing a conventional production process of a powder coating, i.e., a process consisting of melt blending, cooling solidification, pulverization and sieving, thereby which can form a cross-linked cured film improved in appearance properties (high gloss, etc.), physical properties (hardness, scratch/mar resistance, etc.), and chemical properties (acid resistance, solvent resistance, etc.), particularly in scratch/mar resistance and/or chemical properties, and which is favorably used for coating of automotive bodies and automotive parts.

SUMMARY OF THE INVENTION

The thermosetting powder coating composition according to the present invention comprises (A) a glycidyl group-containing acrylic resin obtained by (co)polymerizing monomers containing an ethylenically unsaturated monomer having a glycidyl group and/or a β-methylglycidyl group, (B) a polycarboxyl curative, and (C) an alcohol adduct of a styrene/maleic anhydride copolymer, and is capable of forming a cross-linked cured film having a 60° gloss value of not less than 80.

In the present invention, (C) the alcohol adduct of a styrene/maleic anhydride copolymer is preferably obtained by addition reaction of a styrene/maleic anhydride copolymer having a number-average molecular weight Mn of not more than 3000 with a monohydric alcohol of 1 to 18 carbon atoms.

In the present invention, it is preferable that (C) the alcohol adduct of a styrene/maleic anhydride copolymer is an addition reaction product of a styrene/maleic anhydride copolymer having a number-average molecular weight Mn of not more than 3000 with a monohydric alcohol of 4 to 14 carbon atoms, and the monohydric alcohol is addition reacted in such an amount that the ratio of addition reaction represented by the following formula (1) becomes 5 to 50% based on the amount of acid anhydride group in the styrene/maleic anhydride copolymer, $$\text{ratio of addition reaction (\%)} = [\{(I_a/I'_a) - (I_b/I'_b)\}/(I_a/I'_a)] \times 100 \quad (1)$$

wherein I is an infrared absorption intensity of the acid anhydride group at 1780 cm$^{-1}$, I' is an infrared absorption intensity at 2000 cm$^{-1}$ in the vicinity of the absorption peak, and characters a and b mean before the reaction and after the reaction, respectively.

In the present invention, (C) the alcohol adduct of a styrene/maleic anhydride copolymer is desirably contained in an amount of preferably 0.3 to 15 parts by weight, more preferably 0.3 to 5 parts by weight, based on 100 parts by weight ((A)+(B)) of the total of (A) the glycidyl group-containing acrylic resin and the (B) polycarboxyl curative.

In the present invention, it is preferable that (C) the alcohol adduct of a styrene/maleic anhydride copolymer has been previously homogeneously mixed with (B) the polycarboxyl curative in a molten state.

That is to say, the thermosetting powder coating composition in the above embodiment comprises, as essential components, (B') a masterbatch curative obtained by previously homogeneously mixing at least a part of (C) the alcohol adduct of a styrene/maleic anhydride copolymer, preferably all of it, with (B) the polycarboxyl curative in a molten state, and (A) the glycidyl group-containing acrylic resin.

In the present invention, it is preferable that (A) the glycidyl group-containing acrylic resin is a copolymer obtained by copolymerizing copolymerizable monomers containing 10 to 60% by weight of glycidyl methacrylate and/or β-methylglycidyl methacrylate and 5 to 45% by weight of styrene, with the proviso that the total amount of all the copolymerizable monomers contained is 100% by weight, and (B) the polycarboxyl curative is at least one substance selected from aliphatic or alicyclic dibasic acids of 8 to 20 carbon atoms, acid anhydrides obtained by dehydrocondensation of the dibasic acids, and polyester resins having a carboxyl group as a main functional group which are solid at room temperature.

In a more preferred embodiment of the present invention, (A) the glycidyl group-containing acrylic resin is a copolymer obtained by copolymerizing copolymerizable monomers containing 10 to 60% by weight of glycidyl methacrylate and/or β-methylglycidyl methacrylate and 5 to 45% by weight of styrene, with the proviso that the total amount of all the copolymerizable monomers contained is 100% by weight, and (B) the polycarboxyl curative is at least one substance selected from aliphatic or alicyclic dibasic acids of 8 to 20 carbon atoms and acid anhydrides obtained by dehydrocondensation of the dibasic acids.

In the present invention, (C) the alcohol adduct of a styrene/maleic anhydride copolymer is an adduct obtained by addition reaction of the styrene/maleic anhydride copolymer having a number-average molecular weight Mn of not more than 3000 with the monohydric alcohol of 4 to 14 carbon atoms reacted in such an amount that the ratio of addition reaction represented by the above formula (1) becomes 5 to 50% based on the amount of acid anhydride group in the styrene/maleic anhydride copolymer, and an unreacted monohydric alcohol may be present in said thermosetting powder coating composition.

The cross-linked cured film according to the present invention is a cured film obtained by thermal curing of a thermosetting powder coating composition comprising (A) a glycidyl group-containing acrylic resin obtained by (co)polymerizing monomers containing an ethylenically unsaturated monomer having a glycidyl group and/or a β-methylglycidyl group, (B) a polycarboxyl curative, and (C) an alcohol adduct of a styrene/maleic anhydride copolymer, and having a 60° gloss value of not less than 80.

The process for preparing a thermosetting powder coating composition according to the present invention is a process for preparing a thermosetting powder coating composition comprising (A) a glycidyl group-containing acrylic resin obtained by (co)polymerizing monomers containing an ethylenically unsaturated monomer having a glycidyl group and/or a β-methylglycidyl group, (B) a polycarboxyl curative, and (C) an alcohol adduct of a styrene/maleic anhydride copolymer, comprising:

previously homogeneously mixing at least a part of (C) the alcohol adduct of a styrene/maleic anhydride copolymer with (B) the polycarboxyl curative in a molten state, and then mixing the resulting (B') masterbatch curative with (A) the glycidyl group-containing acrylic resin obtained by (co)polymerizing monomers containing an ethylenically unsaturated monomer having a glycidyl group and/or a β-methylglycidyl group, and the rest of (C) alcohol adduct of a styrene/maleic anhydride copolymer.

According to the present invention, there is provided a thermosetting powder coating resin composition, especially an acrylic powder coating composition, which is capable of forming a cross-linked cured film having excellent appearance properties (high gloss, etc.), physical properties (hardness, scratch/mar resistance, etc.), and chemical properties (acid resistance, solvent resistance, etc.), particularly having improved scratch/mar resistance and/or chemical properties, and which is favorably used for coating of automotive bodies and automotive parts.

According to the process of the present invention for preparing a thermosetting powder coating composition, by virtue of the masterbatch operation, a function of improving blending efficiency and dispersibility inherent in (C) the alcohol adduct of a styrene/maleic anhydride copolymer tends to be steadily reproduced with practical level, and from the resulting thermosetting powder coating composition, a cross-linked cured film having the above-mentioned excellent properties tends to be steadily obtained.

DETAILED DESCRIPTION OF THE INVENTION

The thermosetting powder coating composition according to the present invention is described in detail hereinafter.

Thermosetting Powder Coating Composition

The thermosetting powder coating composition according to the present invention contains, as essential components, (A) a glycidyl group-containing acrylic resin obtained by (co)polymerizing monomers containing as an essential monomer an ethylenically unsaturated monomer having a glycidyl group and/or a β-methylglycidyl group, (B) a polycarboxyl curative, and (C) an alcohol adduct of a styrene/maleic anhydride copolymer.

A cross-linked cured film obtained by thermally baking the thermosetting powder coating composition preferably has a 60° gloss value of not less than 80.

(A) The glycidyl group-containing acrylic resin, (B) the polycarboxyl curative, and (C) the alcohol adduct of a styrene/maleic anhydride copolymer contained in the thermosetting powder coating composition are described first.

(A) Glycidyl Group-containing Acrylic Resin (A) The glycidyl group-containing acrylic resin is obtained by copolymerizing (a) glycidyl methacrylate and/or β-methylglycidyl methacrylate and (b) another ethylenically unsaturated monomer copolymerizable with the monomer (a).

The amount of the glycidyl methacrylate and/or β-methylglycidyl methacrylate (a) used is not specifically restricted, but in the present invention, it is in the range of preferably 10 to 60% by weight, more preferably 20 to 50% by weight, based on 100% by weight of the total of all the ethylenically unsaturated monomer components used ((a)+(b)). If the amount of the component (a) is less than 10% by weight, the resulting cross-linked cured film sometimes has insufficient physical properties and chemical properties. If the amount thereof exceeds 60% by weight, the cost becomes high, resulting in lack of practicability.

Examples of the ethylenically unsaturated monomers (b) copolymerizable with the monomer (a) include:

(meth)acrylic esters, such as methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-amyl (meth)acrylate, isoamyl (meth)acrylate, n-hexyl (meth)acrylate, 2-ethylhexyl (meth) acrylate, octyl (meth)acrylate, dodecyl (meth)acrylate, stearyl (meth)acrylate, tridecyl (meth)acrylate, lauroyl (meth)acrylate, cyclohexyl (meth)acrylate, isoboronyl (meth)acrylate, benzyl (meth)acrylate, phenyl (meth) acrylate, dimethylaminoethyl (meth)acrylate, and diethylaminoethyl (meth)acrylate;

carboxyl group-containing vinyls, such as acrylic acid, methacrylic acid, maleic acid and itaconic acid, and monoesters thereof;

aromatic vinyls, such as styrene, α-methylsytene, vinyltoluene and t-butylstyrene;

hydroxyl group-containing vinyls, such as hydroxyethyl acrylate, 2-hydroxyethyl (meth)acrylate, 3-hydroxypropyl (meth)acrylate, 4-hydroxybutyl (meth)acrylate, (poly) ethylene glycol mono(meth)acrylate, hydroxyethyl vinyl ether, and lactone-modified hydroxyethyl (meth)acrylate;

halogen-containing vinyls, such as vinyl chloride, vinylidene chloride, vinyl fluoride, monochlorotrifluoroethylene, tetrafluoroethylene, and chloroprene; and other monomers, such as acrylonitrile, methacrylonitrile, vinyl acetate, vinyl propionate, acrylamide, methacrylamide, methylolacrylamide, methylolmethacrylamide, ethylene, propylene, α-olefins of 4 to 20 carbon atoms, and vinyl pyrrolidone.

In addition to the above monomers, macromonomers having, as segments, polymers of monomers containing the above monomers and having a vinyl group as the end group are also employable in the present invention.

The expression "methyl (meth)acrylate" used herein means methyl acrylate and/or methyl methacrylate.

The above monomers may be used singly or in combination of two or more kinds.

There is no specific limitation on the combination of the glycidyl methacrylate and/or β-methylglycidyl methacrylate (a) and the ethylenically unsaturated monomer (b) copolymerizable with the monomer (a) and on the weight ratio of these monomers, etc., but it is preferable to use 5 to 45% by weight of styrene based on 100% by weight of all of the ethylenically unsaturated monomer components ((a)+(b)). Since styrene is inexpensive and readily available, (A) the glycidyl group-containing acrylic resin can be prepared at a low cost. However, if styrene is used in an amount of more than 45% by weight, out-door-durability (weatherability) of the resulting cross-linked cured film is deteriorated, and it tends to be difficult to retain excellent gloss for a long period of time under the outdoor exposure.

The process for preparing (A) the glycidyl group-containing resin is not specifically restricted as long as a resin substantially having desired properties can be obtained. For example, polymerization processes conventionally known, such as emulsion polymerization, suspension polymerization, bulk polymerization and solution polymerization, are employable, and above all, solution polymerization is preferably employed.

In the solution polymerization, the prescribed ethylenic monomers, namely, the glycidyl methacrylate and/or β-methylglycidyl methacrylate (a) and the ethylenically unsaturated monomer (b) copolymerizable with the monomer (a), and a polymerization initiator are fed into an organic solvent having been heated, whereby copolymerization reaction is conducted in the organic solvent.

Subsequently, from the resulting polymer solution, the organic solvent is distilled off under reduced pressure. Thus, (A) the glycidyl group-containing acrylic resin containing no solvent is prepared. The weight-average molecular weight Mw of the copolymer (A) the glycidyl group-containing acrylic resin obtained is not specifically restricted, but it is in the range of preferably 2500 to 20000, particularly preferably 3000 to 10000. If the weight-average molecular weight Mw of the copolymer (A) is less than 2500, physical properties and chemical properties of the resulting cross-linked cured film are sometimes deteriorated, and if it exceeds 20000, appearance properties of the resulting film is sometimes impaired.

The weight-average molecular weight Mw can be measured by gel permeation chromatography (GPC) using polystyrene as a standard substance.

There is no specific limitation also on the measured glass transition temperature Tg of the copolymer (A) the glycidyl group-containing acrylic resin, but the Tg is preferably in the range of 30 to 70° C. If the Tg is lower than 30° C., marked blocking or coagulation of the powder coating particles takes place, and if the Tg exceeds 70° C., appearance properties of the resulting film is sometimes impaired.

The glass transition temperature Tg can be measured by DSC (differential scanning calorimeter) or the like.

The epoxy equivalent weight (EEQ) of the copolymer (A) the glycidyl group-containing acrylic resin, as analyzed by perchloric acid titration, is in the range of usually 230 to 1400 g/eq., and from the viewpoint of balance between the properties and the production cost of the resulting cured film, it is in the range of preferably 280 to 700 g/eq.

(B) Polycarboxyl Curative

As (B) the polycarboxyl curative for the thermosetting powder coating of the present invention, an aliphatic or alicyclic dibasic acid of 8 to 20 carbon atoms, a dehydrocondensate thereof, or a polyester resin which has a carboxyl group as a main functional group and is solid at room temperature is used. Particularly, an aliphatic or alicyclic dibasic acid of 8 to 20 carbon atoms or its dehydrocondensate is preferably used.

Examples of the aliphatic dibasic acids include linear aliphatic dibasic acids, such as suberic acid, azelaic acid, sebacic acid, undecanedioic acid, dodecanedioic acid, brassylic acid, tetradecanedioic acid, pentadecanedioic acid, hexadecanedioic acid, heptadecanedioic acid, octadecanedioic acid, and eicosanedioic acid.

Examples of the alicyclic dibasic acids include 1,3-cyclohexanedicarboxylic acid and 1,4-cyclohexanedicarboxylic acid.

Of these, dodecanedioic acid is particularly preferable. The dehydrocondensate is prepared by dehydrocondensation of one or more of the aliphatic or alicyclic dibasic acids using acetic anhydride, and is preferably a linear polyacid anhydride of dodecanedioic acid alone. A corresponding commercially available one is, for example, "Additol VXL1381" (available from Solutia Inc.).

As the polyester resin which has a carboxyl group as a main functional group and is solid at room temperature, a polyester resin having one or more carboxyl groups on average in one molecule, an acid value of 20 to 200 mgKOH/g, a glass transition temperature Tg of 20 to 80° C. and a number-average molecular weight Mn of 100 to 10000 is employable, and a desired one is easily available. A commercially available polyester resin is, for example, "Albester 2230" (available from Eastman Chemical Co.).

(C) Alcohol Adduct of Styrene/Maleic Anhydride Copolymer (C) The alcohol adduct of a styrene/maleic anhydride copolymer for use in the present invention is an addition reaction product of a styrene/maleic anhydride copolymer with the below-described monohydric alcohol.

The styrene/maleic anhydride copolymer used as a starting material in the preparation of (C) the alcohol adduct of a styrene/maleic anhydride copolymer desirably has a number-average molecular weight Mn (measuring method: gel permeation chromatography (GPC), standard substance: polystyrene) of not more than 3000, preferably not more than 2500. The lower limit is usually 800 or more.

If the number-average molecular weight Mn of the styrene/maleic anhydride copolymer is more than 3000, it becomes difficult to increase the 60° gloss value of the resulting cross-linked cured film to not less than 80. Examples of the styrene/maleic anhydride copolymers having a number-average molecular weight of not more than 3000 include "SMA1000", "SMA2000" and "SMA3000" (trade names, all available from Elf Atochem).

The monohydric alcohol to be addition reacted with the styrene/maleic anhydride copolymer and used for the preparation of (C) the alcohol adduct is a monohydric alcohol of 1 to 18 carbon atoms. Examples of such monohydric alcohols include linear or branched aliphatic saturated alcohols, such as methyl alcohol, ethyl alcohol, propyl alcohol, isopropyl alcohol, butyl alcohol, isobutyl alcohol, tertiary butyl alcohol, n-amyl alcohol, isoamyl alcohol, hexyl alcohol, heptyl alcohol, isohepthyl alcohol, octyl alcohol, capryl alcohol, nonyl alcohol, decyl alcohol, undecyl alcohol, lauryl alcohol, tridecyl alcohol, myristyl alcohol, pentadecyl alcohl, cetyl alcohol, heptadecyl alcohol, and stearyl alcohol; and aliphatic oxy-acids, such as glycolic acid, lactic acid, hydracrylic acid, α-hydroxybutyric acid, tartronic acid, malic acid, citric acid, and 12-hydroxystearic acid.

These monohydric alcohols can be used singly or in combination of two or more kinds Of these, linear aliphatic saturated alcohols of 4 to 14 carbon atoms are preferable.

Examples of the linear aliphatic saturated alcohols of 4 to 14 carbon atoms include butyl alcohol, n-amyl alcohol, hexyl alcohol, heptyl alcohol, octyl alcohol, nonyl alcohol, decyl alcohol, undecyl alcohol, lauryl alcohol, tridecyl alcohol and myristyl alcohol. Of these, heptyl alcohol is particularly preferable.

In case of monohydric alcohols of 19 or more carbon atoms, haze of the resulting cross-linked cured film becomes marked and the gloss tends to be lowered.

Next, the process for preparing (C) the alcohol adduct from the styrene/maleic anhydride copolymer and the monohydric alcohol is described.

When the styrene/maleic anhydride copolymer and the monohydric alcohol are allowed to react with each other, ring-opening addition reaction proceeds, and (C) the alcohol adduct of a styrene/maleic anhydride copolymer is obtained.

The above reaction can be readily carried out by directly heating the styrene/maleic anhydride copolymer and the monohydric alcohol to melt them in the absence of a solvent.

The acid anhydride group of the styrene/maleic anhydride copolymer undergoes ring-opening addition reaction with the alcoholic hydroxyl group to form a half ester, namely, a structure having both of a carboxyl group and an alkyl ester side chain.

According to the experience of the present inventors, in the addition reaction with the styrene/maleic anhydride copolymer in the present invention, the monohydric alcohol is used in an amount of 1.0 to 5.0 times mol, preferably 1.0 to 3.0 times mol, based on the amount of the acid anhydride group in the styrene/maleic anhydride copolymer. Usually, the acid value of the styrene/maleic anhydride copolymer is measured on the basis that one acid anhydride group corresponds to two carboxyl groups. In other words, therefore, in a preferred embodiment, the monohydric alcohol is used in an amount of 0.5 to 1.5 times mol based on the amount of corresponding carboxyl groups in the styrene/maleic anhydride copolymer counted by acid value measurement method.

In the present invention, the ratio of addition reaction of the above reaction can be arbitrarily selected from the range of less than 100% (i.e., whole addition) to more than 0% (i.e., partial addition), but it is preferably in the range of 5 to 50%. If the ratio of addition reaction is less than 5%, improvement of the resulting cross-linked cured film in the scratch/mar resistance and/or chemical properties tends to be not found. If the rate of addition reaction exceeds 50%, it becomes difficult to increase the 60° gloss value to not less than 80, though improvement in the scratch/mar resistance and/or chemical properties is found.

The "ratio of reaction" of the addition reaction is, in other words, "degree of conversion" of the acid anhydride group in the styrene/maleic anhydride copolymer into a half ester, and is defined in the present invention by the following formula (1) using infrared absorption intensities ($I_a$, $I_b$), before and after the addition reaction, of the acid anhydride group in the styrene/maleic anhydride copolymer at 1780 cm$^{-1}$ that is the absorption peak of the acid anhydride group, as measured by infrared spectroscopic analysis, and infrared absorption intensities ($I'_a$, $I'_b$), before and after the addition reaction, at 2000 cm$^{-1}$ that is in the vicinity of the absorption peak.

$$\text{Ratio of addition reaction (\%)} = [\{(I_a/I'_a) - (I_b/I'_b)\}/(I_a/I'_a)] \times 100 \quad (1)$$

wherein I is an infrared absorption intensity of the acid anhydride group at 1780 cm$^{-1}$, I' is an infrared absorption intensity at 2000 cm$^{-1}$ in the vicinity of the absorption peak, and characters a and b mean before the reaction and after the reaction, respectively.

Regarding the unreacted monohydric alcohol in the (C) the alcohol adduct from the styrene/maleic anhydride copolymer, which remains in (C) especially when excess molar amount of monohydric alcohol up to 5.0 times mol based on the amount of the acid anhydride group in the styrene/maleic anhydride copolymer is used and the ratio of addition reaction defined by the formula (1) is low such as the preferable range between 5 to 50% and, further, the intentional removal or recover is not operated, is not necessary to be completely eliminated. That is, in the preferable embodiment in the present invention, such amount of unreacted monohydric alcohol that remains in (C) the alcohol adduct from the styrene/maleic anhydride copolymer and then introduced in the resultant thermosetting powder coating composition gives no significant deterioration of the properties of the cross-linked cured film.

In the present invention, (C) the alcohol adduct of a styrene/maleic anhydride copolymer thus obtained or a reaction product containing both of (C) the alcohol adduct and the unreacted alcohol (also referred to as "substance containing the adduct (C)" or "adduct (C)-containing substance") can be blended as it is, as a constituent of the powder coating, with the components (A) and (B) to formulate a thermosetting powder coating, but it may be partially or wholly melt blended with (B) the polycarboxyl curative in a molten state to form (B') a masterbatch curative, prior to use or formulate.

By virtue of the masterbatch operation, the function of improving blending efficiency and dispersibility inherent in (C) the alcohol adduct of a styrene/maleic anhydride copolymer tends to be steadily reproduced with practical level.

Blending Ratio Between (A) Glycidyl Group-containing Acrylic Resin, (B) Polycarboxyl Curative and (C) Alcohol Adduct of Styrene/Maleic Anhydride Copolymer There is no specific limitation on the blending ratio between (A) the glycidyl group-containing acrylic resin and (B) the polycarboxyl curative used in the present invention, but from the viewpoint of good balance among the appearance properties, the physical properties, and the chemical properties of the coating film, the molar ratio ((ac)/(eq)) of the total mol (ac) of the carboxyl group and the acid anhydride group in (B) the polycarboxyl curative to the total mol (eq) of the glycidyl group and the β-methylglycidyl group in (A) the glycidyl group-containing acrylic resin is preferably 0.7–1.3/1.0, more preferably 0.8–1.2/1.0.

The dosage of (C) the alcohol adduct of a styrene/maleic anhydride copolymer is in the range of preferably 0.3 to 15 parts by weight, more preferably 0.3 to 5 parts by weight, based on 100 parts by weight of the total of (A) the glycidyl group-containing acrylic resin and (B) the polycarboxyl curative. If the dosage of (C) the alcohol adduct of a styrene/maleic anhydride copolymer is less than 0.3 part by weight based on 100 parts by weight of the total of (A) the glycidyl group-containing acrylic resin and (B) the polycarboxyl curative, the blending or dispersing function given by (C) the alcohol adduct of a styrene/maleic anhydride copolymer tends to become insufficient, and the scratch/mar resistance and/or chemical properties is (are) not improved so much. If the dosage thereof exceeds 15 parts by weight, the gloss value of the resulting coating film tends to be markedly lowered.

Coating Additives

To the thermosetting powder coating composition of the present invention, various additives employable for usual powder coatings may be added when needed, within limits not detrimental to the smoothness and properties of the coating film. For example, according to the uses of the coating composition, synthetic resins, such as epoxy resin, polyester resin and polyamide resin, may be appropriately added to improve film properties. Further, additives, such as pigment, flow additive, thixotropic agent (thixotropy modifier), charge control agent, surface modifier, gloss control agent, slipping agent, anti-blocking agent, plasticizer, ultraviolet light absorber, light stabilizer, degassing agent, antioxidant, and curing catalyst may be appropriately added. Especially when the thermosetting powder coating composition of the invention is used as a clear coating, a pigment may be added to the composition in a small amount to color it within limits not detrimental to the transparency of the coating film.

Difference Between the Preceding Technique and the Present Invention

Next, preceding techniques other than the aforesaid ones are given to further clarify the difference between the preceding techniques and the present invention.

As previously described, the object of the present invention is to improve blending efficiency and dispersibility of the components for constituting a powder coating, particularly those between the resin component and the curative component, and thereby improve properties of the resulting cross-linked cured film, particularly scratch/mar resistance and/or chemical properties thereof. As the technical means to attain the object, the alcohol adduct (C) of a styrene/maleic anhydride copolymer is added as a dispersion promoter to the glycidyl group-containing acrylic resin (A) as a resin component and the polycarboxyl curative (B) as a curative component.

Technique using the alcohol adduct (C) of a styrene/maleic anhydride copolymer similarly to the present invention is described in, for example, Japanese Paten Laid-Open Publication No. 345076/2000 (publication (a)). In this publication (a), (C) the alcohol adduct of a styrene/maleic anhydride copolymer is added as a matting agent to a so-called polyester/epoxy hybrid powder coating consisting of a bisphenol A type epoxy resin that is an epoxy resin in a narrow sense and a polyester resin having a carboxyl group as a main functional group, said polyester resin being employable also in the present invention.

The difference between the publication (a) and the present invention resides in that the resin component (A) of the present invention belongs to an epoxy resin in a broad sense but is an acrylic resin in a narrow sense and that the present invention forms a cross-linked cured film having a 60° gloss value of not less than 80 and is not a matting powder coating. In a preferred embodiment of the present invention, a cross-linked cured film of high gloss is obtained by specifying particularly the number-average molecular weight Mn of the styrene/maleic anhydride copolymer, the type of the monohydric alcohol that is addition reacted therewith, and the rate of addition reaction.

In WO9916838 (also referred to as "publication (b)"), there is also a description of a matting powder coating wherein a styrene/maleic anhydride copolymer not modified with a monohydric alcohol is used for a combination of (A) a glycidyl group-containing acrylic resin and (B) a polycarboxyl curative, said combination being identical with the combination in the present invention. In this publication (b), the 60° gloss value of the resulting cured film is less than 80 similarly to the above publication (a), and there is neither described nor suggested the specific function of (C) the alcohol adduct of a styrene/maleic anhydride copolymer in the thermosetting powder coating composition of the present invention, such as remarkable improvement of the coating film in the scratch/mar resistance and/or chemical properties due to the blending of (C) the alcohol adduct with the components (A) and (B).

In these preceding techniques (a) and (b), the styrene/maleic anhydride copolymer or its alcohol adduct does not contribute to the mutual solubility between the resin component for forming a matrix and the curative component, or rather, incompatibility is utilized to obtain a matting effect. In contrast therewith, the present invention uses the component (C) as a dispersion promoter capable of dissolving both of the components (A) and (B), and as a result, a cross-linked cured film having a 60° gloss value of not less than 80 and improved in many physical and chemical properties, such as hardness, scratch/mar resistance, acid resistance and solvent resistance, is obtained.

Although the reason why such a cross-linked cured film is obtained has not completely proved, the present inventors believe it could be realized to enhance the specific functions as a dispersion promoter of (C) the alcohol adduct of a styrene/maleic anhydride copolymer by redesigning and precisely controlling the polymer structure of (C) the alcohol adduct of a styrene/maleic anhydride copolymer through the five hypotheses below.

1. Since styrene and maleic anhydride are apt to be copolymerized alternatively, the interval between each acid anhydride group in the copolymer is substantially short and such highly acid anhydride functional copolymer causes sever local shrinkage, as a first mechanism of matting effect, in the cross-linking or curing step of thermosetting powder coating under baking which results in the roughness of the film surface giving mat finish appearance. As a matter of fact, styrene/maleic anhydride copolymer not modified with a monohydric alcohol described in the "publication (b)" reduces the film gloss significantly even at the low dosage less than 5 parts by weight based on 100 parts by weight of the total of (A) the glycidyl group-containing acrylic resin and (B) the polycarboxyl curative, which is the preferred dosage range of (C) the alcohol adduct of a styrene/maleic anhydride copolymer in the present invention, and it is difficult to get a 60° gloss value of not less than 80.

2. The addition reaction of the styrene/maleic anhydride copolymer with alcohol forms a half ester, namely, a structure having both of a carboxyl group and an alkyl ester side chain. This polymer structure can still have a matting effect as described in the "publication (a)", because the interval between each acid anhydride group and carboxyl group in the copolymer is still short and can cause sever local shrinkage which results in the mat finish appearance. But from the view point of chemical structure between (C) the alcohol adduct of a styrene/maleic anhydride copolymer, it has two different segments simultaneously in the polymer structure one of which is close to (A) and the other of which is the same as (B). That is, the styrene blocks in (C) have close character to (A), and both (C) and (B) have carboxyl groups. Therefore, (C) has a potential polymer structure not only as a matting agent for reducing the film gloss but also as a dispersion promoter for enhancing the mutual solubility or dispersibility between (A) and (B), and the balance of these two different functions must be controllable by precise design of the polymer structure.

3. For the purpose of this invention to get high gloss coating film, the function of (C) the alcohol adduct of a styrene/maleic anhydride copolymer as a matting agent should be disappeared. In order to hide this function, it's preferable the styrene/maleic anhydride copolymer has low number average molecular weight Mn, as a main chain, to reduce the local shrinkage effect. On the other hand, as for the ratio of addition reaction with alcohol seems to have optimum range, because too low modification ratio can't give good enough affinity or compatibility with (B) the carboxyl curatives and must show again strong matting effect as described in the "publication (b)" due to the phase separation in the final cross-linked cured film which is the second mechanism of matting effect. On the contrary, too high modification ratio takes a risk to reduce the film gloss again by the local shrinkage (the first mechanism of matting effect), because the carboxyl groups introduced in a high amount have higher reactivity with (A) the glycidyl group-containing acrylic resin than the acid anhydride groups.

Furthermore, this suitable range of the modification ratio must be fluctuated by the kinds of addition reacted alcohol, especially by their carbon numbers or side chain length because of the next two reasons. The first reason is that the steric hindrance effect of an alkyl ester side chain to an adjacent carboxyl group in a half ester structure of (C) must affect directly both the affinity or compatibility between (C) and (B) and the reactivity of the carboxyl groups with (A), and they must indirectly affect the condition of phase separation (the first matting mechanism) and local shrinkage (the second matting mechanism), respectively.

The second reason is that the length of an alkyl ester side chain in (C) must affect directly the ability of (C) to tangle with other components (A) and (B) on the molecular level in the conventional mechanical melt blending technique, and it must indirectly affect the condition of phase separation (the first matting mechanism), because the acrylic thermosetting powder coating compositions typically comprising of glycidyl-group containing acrylic resins and polycarboxyl curatives are substantially very difficult to be homogeneous compound or the melt blend to the molecular level in the present mechanical melt blending technique as described above.

4. If the polymer structure of (C) the alcohol adduct of a styrene/maleic anhydride copolymer can be suitably designed to avoid the two important matting mechanisms, that is, local shrinkage and phase separation, to recover the high film gloss by controlling the number average molecular weight Mn of styrene/maleic anhydride copolymer, types of alcohol addition reacted, and the ratio of the addition reaction modification, this precisely controlled (C) the alcohol adduct of a styrene/maleic anhydride copolymer must have the next four different functional segments simultaneously in one molecular and be able to give high gloss coating film with excellent properties.

a. Styrene blocks easy to be homogeneously melt blended with (A) the glycidyl group-containing acrylic resin due to the good affinity or compatibility.

b. Unmodified acid anhydride groups easy to be homogeneously melt blended with (B) the polycarboxyl curative due to the good affinity or compatibility, and can give new cross-linking branching points by further reaction with the secondary hydroxyl groups given after the curing reaction between (A) the glycidyl group-containing acrylic resin and (B) the polycarboxyl curative.

c. Carboxyl groups easy to be homogeneously melt blended with (B) the polycarboxyl curative due to the good affinity or compatibility.

d. Alkyl ester side chain easy to be homogeneously melt-blended with (A) the glycidyl group-containing acrylic resin and (B) the polycarboxyl curative (A) due to the ability of polymer entanglement in the kneading step.

5. In addition, small amount of unreacted residual alcohol in (C) the alcohol adduct of a styrene/maleic anhydride copolymer must give no significant deterioration of the coating film properties, because it can be consumed by the reaction with acid anhydride groups in (C) the alcohol adduct of a styrene/maleic anhydride copolymer or the acid anhydride as one of the preferred polycarboxyl curative component (B) obtained by dehydrocondensation of the dibasic acids.

By the way, if an excess of the monohydric alcohol is used in the addition reaction of the styrene/maleic anhydride copolymer with the monohydric alcohol, the unreacted monohydric alcohol remains and coexists even if 100% of the ratio of addition reaction is obtained in the reaction of the styrene/maleic anhydride copolymer with the monohydric alcohol, and the residual content greatly depends upon the boiling point of the monohydric alcohol. The preceding technique that positively utilizes a compound having an alcoholic hydroxyl group is, for example, DE4227580 (preceding technique (c)). In this preceding technique (c), (A) a glycidyl group-containing acrylic resin identical with that of the present invention and an aliphatic dibasic acid polyacid anhydride as (B) a polycarboxyl curative are selected, and as a third component, a polyol is used. In this preceding technique (c), the polyol is used to increase the curing reaction rate. The reaction rate of the glycidyl group with the acid anhydride group is generally slow. It is thought that in order to increase the reaction rate, the acid anhydride group needs to be temporarily ring-opened in the reaction with the alcoholic hydroxyl group, and hence a polyol is preferably employed.

In the present invention, however, the residual alcohol is not such a polyol as described in the preceding technique (c) but a monohydric alcohol, and in the present invention, (C) the alcohol adduct of a styrene/maleic anhydride copolymer is essential. At these points, the present invention is different from the preceding technique (c).

The action and effect given by the use of only a monohydric alcohol without using (C) the alcohol adduct of a styrene/maleic anhydride copolymer that is used in the present invention are described below.

When the monohydric alcohol is used as a coating additive or a third component in combination with a polyacid anhydride curative, an action of increasing the ring-opening rate itself of the acid anhydride group of the curative can be expected. The monohydric alcohol, however, does not contribute to enhance the cross-linking density different from the polyol, and because the monohydric alcohol has a function of a non-crosslinkable diluent, enhancement of the film hardness or shortening of the gel time of coatings is not brought about. That is to say, use of the monohydric alcohol does not correspond to the former two of the aforesaid technical approaches to improve scratch/mar resistance and/or chemical properties of the coating film, namely, "enhancement of cross-linking density of the coating film" and "enhancement of hardness of the coating film", and hence improvement of scratch/mar resistance and/or chemical properties by such means is not achieved. It's needless to say, when the curative does not have an acid anhydride group that is employable in the present invention, the cross-linking density and the hardness are generally lowered.

As for the aforesaid third approach, namely, "special functions of the coating film surface layer, such as slipping function, hyper-hydrophoboic character", technique to improve smoothness of a coating film by the use of a higher monohydric alcohol of 15 or more carbon atoms is mentioned as a reference example in Japanese Patent Laid-Open Publication No. 291229/1997.

In this reference example, the main object is to improve film appearance. However, most of higher monohydric alcohols used are waxy, so that by allowing the monohydric alcohol to be present on the surface of the coating film, the coating film can be imparted with slipping function. However, even if such a non-crosslinkable slipping agent is used, the scratch/mar resistance and/or chemical properties is (are) not improved at the same time, unlike the present invention, because such film properties greatly depend upon the cross-linking density and its homogeneity.

By the fact that the monohydric alcohols employable in the addition reaction of the present invention may include relatively lower monohydric alcohols, it is suggested that the slipping function of the coating film surface layer is not a main factor to improve scratch/mar resistance and/or chemical properties of the coating film.

From the above, it is clear that (C) the alcohol adduct of a styrene/maleic anhydride copolymer, which is blended with the components (A) and (B), plays a main role in the improvement of scratch/mar resistance and/or chemical properties of a coating film in the present invention. In addition, the amount and the type of the unreacted monohydric alcohol remaining in the thermosetting powder coating composition, after use for the preparation of the component (C), are not specifically restricted, and the particularly important are the type of the monohydric alcohol that is addition reacted with the styrene/maleic anhydride copolymer and the ratio of addition reaction. In the present invention, (C) the alcohol adduct of a styrene/maleic anhydride copolymer and the components (A) and (B) are used in combination, and therefore, the aforesaid excellent effects, which could not been achieved even by any of the preceding techniques, are obtained.

Preparation of Thermosetting Powder Coating Composition

In order to prepare the thermosetting powder coating composition comprising (A) the glycidyl group-containing acrylic resin, (B) the polycarboxyl curative, and (C) the alcohol adduct of a styrene/maleic anhydride copolymer, general melt blending methods conventionally known are adoptable in the present invention, and the methods of blending the components and the melt blending are not specifically restricted.

For melt blending the components, known blending machines, such as heated roller, heated kneader and extrusion blending machine (extruder), are appropriately used. When these blending machines are operated, the blending conditions (temperature, number of revolutions, atmosphere, etc.) have only to be appropriately determined.

According to the present invention, however, in the preparation of the thermosetting powder coating composition comprising (A) the glycidyl group-containing acrylic resin obtained by (co)polymerizing monomers containing an ethylenically unsaturated monomer having a glycidyl group and/or a β-methylglycidyl group, (B) the polycarboxyl curative and (C) the alcohol adduct of a styrene/maleic anhydride copolymer, it is preferable that:

at least a part, preferably all, of (C) the alcohol adduct of a styrene/maleic anhydride copolymer is previously homogeneously mixed with (B) the polycarboxyl curative in a molten state, and then the resulting (B') masterbatch curative is mixed with (A) the glycidyl group-containing acrylic resin obtained by (co)polymerizing monomers containing an ethylenically unsaturated monomer having a glycidyl group and/or a β-methylglycidyl group, and the rest of (C) alcohol adduct of a styrene/maleic anhydride copolymer.

In this case, instead of the alcohol adduct (C) of a styrene/maleic anhydride copolymer, an adduct (C)- containing substance, which contains not only the adduct (C) but also the unreacted monohydric alcohol remaining after the preparation of the adduct (C), may be used.

When the thermosetting powder coating composition of the present invention is prepared as described above, excellent blending properties and dispersibility between the component (A) and the component (B) due to the use of the component (C) are exhibited, and a coating film having the aforesaid excellent properties can be obtained with high reproducibility on a practical scale.

The melt blend obtained through the above process is then subjected to cooling solidification, pulverization and sieving to obtain a coating composition in the form of a powder. In order to obtain such a pulverizate (powder), a conventionally known method is adoptable. For example, in order to obtain a pulverizate having an average particle diameter of 10 to 90 $\mu$m, a hammer mill or the like is employable.

In the present invention, the particle size of the thermosetting powder coating composition (powder coating) is not specifically restricted, and for example, a composition having a volume average particle diameter of about 20 to 40 $\mu$m is employable.

Coating Method and Baking Method

The powder coating (thermosetting powder coating composition) of the present invention obtained as above is allowed to spray to the coating object (metal substrate, undercoated metal surface, etc.) by a coating method such as electrostatic spray coating or fluidized bed dipping, and then heated and cured to form a cross-linked coating film (cured film).

The substrate as the coating object may be a metal substrate such as aluminum or steel, or may be a metal substrate having been subjected to undercoating treatment.

Baking of an uncured film formed from the thermosetting powder coating composition of the present invention is usually carried out at a temperature of about 100 to 180° C., preferably 120 to 160° C., for a period of about 10 to 60 minutes.

Not only when a conventional solvent-borne paint is used as an undercoating paint but also when a water-borne paint is used as an undercoating paint, the top coating film obtained by applying the thermosetting powder coating composition of the present invention onto the undercoating film and baking the composition exhibits excellent properties similarly to the case where the acrylic solvent-borne paint is used as the top coating paint.

That is to say, when the water-borne undercoating paint (including a paint containing pigment and/or metal powder) is applied and dried for a given period of time and then the thermosetting powder coating composition of the present invention is applied onto the resulting undercoating film by the above method and heated to cure the composition, a top coating film having the above-mentioned excellent properties can be formed.

The thermosetting powder coating composition of the present invention is favorably used for coating of substrate surfaces of coating objects, such as automotive bodies and automotive parts (e.g., aluminum wheel, wiper, pillar, door handle, fender, bonnet, air spoiler, stabilizer and grille).

Effect of the Invention

According to the present invention, specific components are used in combination as the components for constituting a powder coating, particularly a resin component and a curative component, without changing a general and conventional production process of the powder coating, i.e., a process consisting of melt blending, cooling solidification, pulverization and sieving, whereby the blending efficiency and dispersibility of the components are improved, and thereby a thermosetting powder coating composition capable of forming a cross-linked cured film improved in appearance properties (high gloss, etc.), physical properties (hardness, scratch/mar resistance, etc.), and chemical properties (acid resistance, solvent resistance, etc.), particularly in scratch/mar resistance and/or chemical properties, and favorably used for coating of automotive bodies and automotive parts, can be provided.

EXAMPLES

The thermosetting powder coating composition of the present invention is further described with reference to the following examples, but it should be construed that the invention is in no way limited to those examples. In the following examples, the terms "part(s)" and "%" are both on the basis of weight, unless otherwise stated.

Preparation Example (a1)
(Preparation of Glycidyl Group-containing Acrylic Resin (A))

In a four-necked flask equipped with a stirrer, a thermometer, a reflux condenser and a nitrogen inlet and discharge pipe, 70 parts of a xylene solvent were placed and heated up to the reflux temperature under stirring with purging the gas phase with nitrogen.

Then, a mixed solution consisting of 40 parts of glycidyl methacrylate, 20 parts of styrene, 35 parts of methyl methacrylate, 5 parts of normal butyl methacrylate (total of monomers: 100 parts) and 6.5 parts of t-butyl peroxy-2-ethylhexanonate as a polymerization initiator, as shown as (a1) in Table 1, was fed to the flask over a period of 5 hours and then maintained at 100° C. for 5 hours to conduct copolymerization reaction of those monomers.

From the resulting resin solution, xylene was distilled off, to obtain a glycidyl group-containing acrylic resin (a1).

The glycidyl group-containing acrylic resin (a1) had a weight-average molecular weight Mw, as measured by gel permeation chromatography (GPC) using polystyrene as a standard substance, of 4950, a glass transition temperature Tg, as measured by DSC (differential scanning calorimeter), of 49° C., and an epoxy equivalent weight, as analyzed by perchioric acid titration, of 366 g/eq.

The compositional ratio of the raw materials for preparing a copolymer, the physical properties of the glycidyl group-containing acrylic resin (a1), etc. are all set forth in Table 1.

Preparation Example (a2)
(Preparation of Glycidyl Group-containing Acrylic Resin (A))

The procedure of Preparation Example (a1) was repeated except that the types and the amounts of the monomers used and the amount of the polymerization initiator were changed as shown in Table 1.

That is to say, 70 parts of xylene were placed in a four-necked flask equipped with a stirrer, a thermometer, a reflux condenser and a nitrogen inlet and discharge pipe and heated up to the reflux temperature under stirring with purging the gas phase with nitrogen.

Then, a mixed solution consisting of 32 parts of β-methylglycidyl methacrylate, 15 parts of styrene, 35 parts of methyl methacrylate, 18 parts of normal butyl methacrylate (total of monomers: 100 parts) and 5.0 parts of t-butyl peroxy-2-ethylhexanonate as a polymerization initiator, as shown as (a2) in Table 1, was fed to the flask over a period of 5 hours and then maintained at 100° C. for 5 hours to conduct copolymerization reaction of those monomers.

From the resulting resin solution, the solvent was distilled off, to obtain a glycidyl group-containing acrylic resin (a2).

The glycidyl group-containing acrylic resin (a2) had a weight-average molecular weight Mw of 7100, a measured Tg of 48° C., and an epoxy equivalent weight, as analyzed by perchloric acid titration, of 501 g/eq.

The compositional ratio of the raw materials for preparing a copolymer, the physical properties of the glycidyl group-containing acrylic resin (a2), etc. are all set forth in Table 1.

Preparation Example (c1)
(Preparation of Substance Containing Alcohol Adduct (C) of Styrene/Maleic Anhydride Copolymer)

In a four-necked flask equipped with a stirrer, a thermometer, a reflux condenser and a nitrogen inlet, 50 parts of a styrene/maleic anhydride copolymer "SMA1000" (available from Elf Atochem, styrene/maleic anhydride molar ratio: 1/1, acid value: 480 mgKOH/g, softening point: 160° C., number-average molecular weight Mn: 1110) and 50 parts of heptyl alcohol were placed, and they were heated up to 170° C. with purging nitrogen, followed by stirring for 90 minutes, to obtain a substance containing a heptyl alcohol adduct (c1) of a styrene/maleic anhydride copolymer.

The resulting substance containing the heptyl alcohol adduct (c1) was solid at room temperature, and the ratio of alcohol addition reaction was 24.3% based on the infrared spectroscopic analysis. The ratio of alcohol addition reaction was calculated from the aforesaid formula (1) using an infrared absorption intensity ratio between 1780 cm$^{-1}$ and 2000 cm$^{-1}$ before the addition reaction of the styrene/maleic anhydride copolymer with heptyl alcohol ($I_a/I'_a$=65.0/42.5) and an infrared absorption intensity ratio after the addition reaction ($I_b/I'_b$=62.5/54.0). These infrared intensities were actually measured by the aforesaid infrared spectroscopic analysis (measuring device: FT/IR-300 model manufactured by JASCO Corporation).

The residual heptyl alcohol content in the (c1)-containing substance, as measured by gas chromatography (GC-14A manufactured by Shimadzu Corporation), was 20% by weight.

In the preparation of the following powder coating composition, the substance containing the heptyl alcohol adduct (c1) of a styrene/maleic anhydride copolymer and containing the residual heptyl alcohol was used.

The starting material composition used, the property values of the substance containing the heptyl alcohol adduct (c1) of a styrene/maleic anhydride copolymer, etc. are all set forth in Table 2.

Preparation Example (c2)
(Preparation of Substance Containing Alcohol Adduct (C) of Styrene/Maleic Anhydride Copolymer)

In a four-necked flask equipped with a stirrer, a thermometer, a reflux condenser and a nitrogen inlet, 50 parts of a styrene/maleic anhydride copolymer "SMA2000" (available from Elf Atochem, styrene/maleic anhydride molar ratio: 2/1, acid value: 355 mgKOH/g, softening point: 150° C., number-average molecular weight Mn: 1754) and 95 parts of 12-hydroxystearic acid were placed, and they were heated up to 170° C. with purging nitrogen, followed by stirring for 90 minutes, to obtain a substance containing a 12-hydroxystearic acid adduct (c2) of a styrene/maleic anhydride copolymer.

The resulting (c2)-containing substance was solid at room temperature, and the ratio of addition reaction of 12-hydroxystearic acid, as determined in the same manner as described above, was 20.1%. The residual 12-hydroxystearic acid content in the (c2)-containing substance was 58% by weight. In the preparation of the following powder coating composition, the substance containing the 12-hydroxystearic acid adduct (c2) of a styrene/maleic anhydride copolymer and containing the residual 12-hydroxystearic acid was used.

The starting material composition used, the property values of the substance containing the 12-hydroxysteratic acid adduct (c2) of a styrene/maleic anhydride copolymer, etc. are all set forth in Table 2.

Preparation Example (b'1)
(Preparation of Masterbatch Curative (B') Consisting of Substance Containing Alcohol Adduct (C) of Styrene/Maleic Anhydride Copolymer and Polycarboxyl Curative (B))

In a four-necked flask equipped with a stirrer, a thermometer, a reflux condenser and a nitrogen inlet, 15 parts of the substance containing the heptyl alcohol adduct (c1) of a styrene/maleic anhydride copolymer and containing the residual heptyl alcohol, obtained in Preparation Example (c1), and 100 parts of dodecanedioic acid as a polycarboxyl curative (B) were placed, and they were heated up to 130° C. with purging the gas phase with nitrogen, followed by stirring for 15 minutes, to obtain a masterbatch curative (b'1).

The ratio of alcohol addition reaction of the heptyl alcohol adduct (c1) in the resulting masterbatch curative (b'1) was 24.5%. Due to the further consumption by the addition reaction having proceeded a little and a small amount of a volatilization of the heptyl alcohol, the residual heptyl alcohol content measured in the same manner as in Preparation Examples (c1) and (c2), was 18% by weight.

The starting materials used and the property values of the masterbatch curative (b'1) are all set forth in Table 2.

Preparation Example (c3)
(Preparation of Substance Containing Alcohol Adduct (C) of Styrene/Maleic Anhydride Copolymer for Comparison)

In a four-necked flask equipped with a stirrer, a thermometer, a reflux condenser and a nitrogen inlet, 50 parts of a styrene/maleic anhydride copolymer "SMA1000" (available from Elf Atochem, styrene/maleic anhydride molar ratio: 1/1, acid value: 480 mgKOH/g, softening point: 160° C.) and 128 parts of eicosyl alcohol were placed, and they were heated up to 170° C. with purging nitrogen, followed by stirring for 90 minutes, to obtain a substance containing an eicosyl alcohol adduct (c3) of a styrene/maleic anhydride copolymer.

The rate of alcohol addition reaction to the styrene/maleic anhydride copolymer, as determined in the same manner as described above, was 10.2%, and the residual eicosyl alcohol content in the (c3)-containing substance was 67% by weight. In the preparation of the following powder coating composition, the substance containing the eicosyl alcohol adduct (c3) of a styrene/maleic anhydride copolymer and containing the residual eicosyl alcohol was used.

The starting materials used, the property values of the substance containing the eisocyl alcohol adduct (c3) of a styrene/maleic anhydride copolymer, etc. are all set forth in Table 2.

Preparation Example (c4)
(Preparation of Substance Containing Alcohol Adduct (C) of Styrene/Maleic Anhydride Copolymer for Comparison)

In a four-necked flask equipped with a stirrer, a thermometer, a reflux condenser and a nitrogen inlet and discharge pipe, 50 parts of "New Frontier MI-400P" (available from Dai-ichi Kogyo Seiyaku Co., Ltd., 1-propyl alcohol adduct of styrene/maleic anhydride copolymer, styrene/maleic anhydride molar ratio: 1/1, softening point: 160° C., number-average molecular weight Mn: 10500), 30 parts of xylene and 0.1 part of dibutyltin oxide were placed, and they were heated and stirred at 110° C. for 10 hours with distilling off 1-propyl alcohol formed by deesterification. From the reaction mixture, xylene was distilled off, to obtain a styrene/maleic anhydride copolymer (number-average molecular weight Mn: 9500, acid value: 465 mgKOH/g), which was not substantially addition reacted with alcohol.

Then, in a four-necked flask equipped with a stirrer, a thermometer, a reflux condenser and a nitrogen inlet, 50 parts of the resulting styrene/maleic anhydride copolymer and 48 parts of heptyl alcohol were placed, and they were heated up to 170° C. with purging nitrogen, followed by stirring for 90 minutes, to obtain a substance containing a heptyl alcohol adduct (c4) of a styrene/maleic anhydride copolymer.

The ratio of heptyl alcohol addition reaction to the styrene/maleic anhydride copolymer, as determined in the same manner as described above, was 22.6%, and the residual heptyl alcohol content in the (c4)-containing substance was 21% by weight. In the preparation of the following powder coating composition, the substance containing the heptyl alcohol adduct (c4) of a styrene/maleic anhydride copolymer and containing the residual heptyl alcohol was used.

The starting material composition, the property values of the substance containing the heptyl alcohol adduct (c4) of a styrene/maleic anhydride copolymer, etc. are all set forth in Table 2.

Preparation Example (c5)
(Preparation of Substance Containing Alcohol Adduct (C) of Styrene/Maleic Anhydride Copolymer for Comparison)

In a four-necked flask equipped with a stirrer, a thermometer, a reflux condenser and a nitrogen inlet and discharge pipe, 50 parts of a styrene/maleic anhydride copolymer "SMA2000" (available from Elf Atochem, styrene/maleic anhydride molar ratio: 2/1, acid value: 355 mgKOH/g, softening point: 150° C., number-average molecular weight Mn: 1754), 37 parts of heptyl alcohol, 100 parts of toluene and 0.2 part of dibutyltin oxide were placed, and they were heated up to the reflux temperature with purging nitrogen, followed by stirring for 24 hours. Then, toluene was distilled off to obtain a substance containing a heptyl alcohol adduct (c5) of a styrene/maleic anhydride copolymer.

The ratio of heptyl alcohol addition reaction to the styrene/maleic anhydride copolymer, as determined in the same manner as described above, was 51.3%, and the residual heptyl alcohol content in the (c5)-containing substance was 26% by weight.

In the preparation of the following powder coating composition, the substance containing the heptyl alcohol adduct (c5) of a styrene/maleic anhydride copolymer and containing the residual heptyl alcohol was used.

The starting material composition, the property values of the substance containing the heptyl alcohol adduct (c5) of a styrene/maleic anhydride copolymer, etc. are all set forth in Table 2.

Example 1
(Preparation of Thermosetting Powder Coating Composition)

Into a Henschel mixer (manufactured by Mitsui Mining Co., Ltd.), 78 parts of the glycidyl group-containing acrylic resin (a1) obtained in Preparation Example (a1), 22 parts of dodecanedioic acid (total weight of the glycidyl group-containing acrylic resin (A) and the polycarboxyl curative (B): 100 parts, the same shall apply hereinafter), 3 parts of the substance containing the heptyl alcohol adduct (c1) of a styrene/maleic anhydride copolymer and containing the unreacted heptyl alcohol, obtained in Preparation Example (c1), and as additives, 2 parts of an ultraviolet light absorber "Tinuvin CGL1545" (available from Ciba Specialty Chemicals K.K.), 1 part of a hindered amine light stabilizer "Tinuvin 144" (available from Ciba Specialty Chemicals K.K.), 0.5 part of benzoin and 0.7 part of a flow additive were all together introduced, and they were dry mixed at room temperature (23° C.) for 3 minutes, followed by melt blending at 115° C. by the use of a single screw extruder (manufactured by Coperion).

Then, the resulting melt blend was subjected to operations of cooling solidification, pulverization and sieving. The particle size of the resulting coating composition was measured by a particle size distribution measuring device of laser diffraction type "SALD-2000A" manufactured by Shimadzu Corporation. As a result, the volume average particle diameter was 27 microns.

The flow additive used above was obtained by preparing a solid homopolymer (weight-average molecular weight Mw: 12200) of isobutyl methacrylate in accordance with Preparation Example (a1) and pulverizing the solid homopolymer to an average particle size of 23 microns.

The molar ratio (ac)/(ep) of the carboxyl group (ac) in the dodecanedioic acid to the glycidyl group (ep) in the glycidyl group-containing acrylic resin (a1) was designed as 0.9.

The parameters for designing, the property values of the resulting thermosetting powder coating composition, etc. are all set forth in Table 3.

Example 2
(Preparation of Thermosetting Powder Coating Composition)

A thermosetting powder coating composition was obtained in the same manner as in Example 1, except that 5 parts of the substance containing the 12-hydroxystearic acid adduct (c2) of a styrene/maleic anhydride copolymer and containing the unreacted 12-hydroxystearic acid, obtained in Preparation Example (c2), was used instead of 3 parts of the substance containing the heptyl alcohol adduct (c1) of a styrene/maleic anhydride copolymer and containing the unreacted heptyl alcohol.

The particle size of the resulting thermosetting powder coating composition was measured by a particle size distribution measuring device of laser diffraction type "SALD-2000A" manufactured by Shimadzu Corporation. As a result, the volume average particle diameter was 25 microns.

The parameters for designing, the property values of the resulting thermosetting powder coating composition, etc. are all set forth in Table 3.

Example 3
(Preparation of Thermosetting Powder Coating Composition)

Into a Henschel mixer (manufactured by Mitsui Mining Co., Ltd.), 68 parts of the glycidyl group-containing acrylic resin (a1) obtained in Preparation Example (a1), 32 parts of "Additol VXL1381" (available from Solutia Inc., acid equivalent weight: 166 g/eq., corresponding to dodecanedioic acid linear polyacid anhydride), 3 parts of the substance containing the heptyl alcohol adduct (c1) of a styrene/maleic anhydride copolymer and containing the unreacted heptyl alcohol, obtained in Preparation Example (c1), and as additives, 3 parts of carbon black ("MA-100" available from Mitsubishi Chemical Corporation), 2 parts of an ultraviolet light absorber "Tinuvin CGL1545" (available from Ciba Specialty Chemicals K.K.), 1 part of a hindered amine light stabilizer "Tinuvin 144" (available from Ciba Specialty Chemicals K.K.), 0.5 part of benzoin, 0.7 part of a flow additive and 0.1 part of tetrabutylphosphonium bromide were all together introduced, and they were dry mixed at room temperature for 3 minutes, followed by melt blending at 65° C. by the use of a single screw extruder (manufactured by Coperion).

Then, the resulting melt blend was subjected to operations of cooling solidification, pulverization and sieving. The particle size of the resulting coating composition was measured by a particle size distribution measuring device of laser diffraction type "SALD-2000A" manufactured by Shimadzu Corporation. As a result, the volume average particle diameter was 28 microns.

The flow additive used above was obtained by preparing a solid homopolymer (weight-average molecular weight Mw: 12200) of isobutyl methacrylate in accordance with Preparation Example (a1) and pulverizing the solid homopolymer to an average particle size of 23 microns.

The molar ratio (ac)/(ep) of the total of the carboxyl group and the acid anhydride group (ac) in the dodecanedioic acid linear polyacid anhydride to the glycidyl group (eq) in the glycidyl group-containing acrylic resin (a1) was designed as 1.05.

The parameters for designing, the property values of the resulting thermosetting powder coating composition, etc. are all set forth in Table 3.

Example 4
(Preparation of Thermosetting Powder Coating Composition)

Into a Henschel mixer (manufactured by Mitsui Mining Co., Ltd.), 37 parts of the glycidyl group-containing acrylic resin (a2) obtained in Preparation Example (a2), 63 parts of a polycarboxyl curative (B) "Albester 2230" (available from Eastman Chemical Co., acid value: 51 mgKOH/g), 4 parts of the substance containing the 12-hydroxystearic acid adduct (c2) of a styrene/maleic anhydride copolymer and containing the unreacted 12-hydroxysteartic acid, obtained in Preparation Example (c2), and as additives, 35 parts of titanium dioxide ("Tipure R-960" available from DuPont K.K.), 2 parts of an ultraviolet light absorber "Tinuvin CGL1545" (available from Ciba Specialty Chemicals K.K.), 1 part of a hindered amine light stabilizer "Tinuvin 144" (available from Ciba Specialty Chemicals K.K.), 0.5 part of benzoin and 0.7 part of a flow additive were all together introduced, and they were dry mixed at room temperature (23° C.) for 3 minutes, followed by melt blending at 120° C. by the use of a single screw extruder (manufactured by Coperion).

Then, the resulting melt blend was subjected to operations of cooling solidification, pulverization and sieving. The particle size of the resulting coating composition was measured by a particle size distribution measuring device of laser diffraction type "SALD-2000A" manufactured by Shimadzu Corporation. As a result, the volume average particle diameter was 29 microns ($\mu$m).

As the flow additive, "Resimix RL-4" available from Mitsui Chemicals, Inc. was used.

The molar ratio (ac)/(ep) of the carboxyl group (ac) in the polyester resin "Albester 2230" to the glycidyl group (ep) in the glycidyl group-containing acrylic resin (a2) was designed as 0.75.

The parameters for designing, the property values of the resulting thermosetting powder coating composition, etc. are all set forth in Table 3.

Example 5
(Preparation of Thermosetting Powder Coating Composition)

Into a Henschel mixer (manufactured by Mitsui Mining Co., Ltd.), 78 parts of the glycidyl group-containing acrylic resin (a1) obtained in Preparation Example (a1), 25 parts of the masterbatch curative (b'1) consisting of dodecanedioic acid and the substance containing the heptyl alcohol adduct (c1) of a styrene/maleic anhydride copolymer and containing the unreacted heptyl alcohol, and as additives, 2 parts of an ultraviolet light absorber "Tinuvin CGL1545" (available from Ciba Specialty Chemicals K.K.), 1 part of a hindered amine light stabilizer "Tinuvin 144" (available from Ciba Specialty Chemicals K.K.), 0.5 part of benzoin and 0.7 part of a flow additive were all together introduced, and they were dry mixed at room temperature for 3 minutes, followed by melt blending at 115° C. by the use of a single screw extruder (manufactured by Coperion).

Then, the resulting melt blend was subjected to operations of cooling solidification, pulverization and sieving. The particle size of the resulting coating composition was measured by a particle size distribution measuring device of laser diffraction type "SALD-2000A" manufactured by Shimadzu Corporation. As a result, the volume average particle diameter was 24 microns.

The flow additive used above was obtained by preparing a solid homopolymer (weight-average molecular weight Mw: 12200) of isobutyl methacrylate in accordance with Preparation Example (a1) and pulverizing the solid homopolymer to an average particle size of 23 microns.

The molar ratio (ac)/(ep) of the carboxyl group (ac) in the dodecanedioic acid to the glycidyl group (ep) in the glycidyl group-containing acrylic resin (a1) was designed as 0.9.

The parameters for designing, the property values of the resulting thermosetting powder coating composition, etc. are all set forth in Table 3.

Comparative Examples 1 and 2
(Preparation of Thermosetting Powder Coating Composition)

Thermosetting powder coating compositions (Comparative Examples 1 and 2) were obtained in the same manner as in Examples 1 and 3, respectively, except that the substance containing the heptyl alcohol adduct (c1) of a styrene/maleic anhydride copolymer and containing the unreacted heptyl alcohol was not used.

The parameters for designing, the property values of the resulting thermosetting powder coating compositions, etc. are all set forth in Table 3.

Comparative Example 3
(Preparation of Thermosetting Powder Coating Composition)

A thermosetting powder coating composition was obtained in the same manner as in Example 1, except that 3 parts of a styrene/maleic anhydride copolymer "SMA1000" not modified with a monohydric alcohol were used instead of the substance containing the heptyl alcohol adduct (c1) of a styrene/maleic anhydride copolymer and containing the unreacted heptyl alcohol.

The parameters for designing, the property values of the resulting thermosetting powder coating composition, etc. are all set forth in Table 3.

Comparative Example 4
(Preparation of Thermosetting Powder Coating Composition)

A thermosetting powder coating composition was obtained in the same manner as in Example 1, except that 4 parts of the substance containing the eicosyl alcohol adduct (c3) of a styrene/maleic anhydride copolymer and containing the unreacted eicosyl alcohol were used instead of the substance containing the heptyl alcohol adduct (c1) of a styrene/maleic anhydride copolymer and containing the unreacted heptyl alcohol.

The parameters for designing, the property values of the resulting thermosetting powder coating composition, etc. are all set forth in Table 3.

Comparative Example 5
(Preparation of Thermosetting Powder Coating Composition)

A thermosetting powder coating composition was obtained in the same manner as in Example 1, except that 3 parts of the substance containing the heptyl alcohol adduct (c4) of a styrene/maleic anhydride copolymer having a number-average molecular weight Mn of 9500 and containing the unreacted heptyl alcohol were used instead of the substance containing the heptyl alcohol adduct (c1) of a styrene/maleic anhydride copolymer and containing the unreacted heptyl alcohol.

The parameters for designing, the property values of the resulting thermosetting powder coating composition, etc. are all set forth in Table 3.

Comparative Example 6
(Preparation of Thermosetting Powder Coating Composition)

A thermosetting powder coating composition was obtained in the same manner as in Example 1, except that 4 parts of the substance containing the heptyl alcohol adduct (c5) of a styrene/maleic anhydride copolymer having the ratio of an alcohol addition reaction of 51.3% and containing the unreacted heptyl alcohol were used instead of the substance containing the heptyl alcohol adduct (c1) of a styrene/maleic anhydride copolymer and containing the unreacted heptyl alcohol.

The parameters for designing, the property values of the resulting thermosetting powder coating composition, etc. are all set forth in Table 3.

Comparative Example 7
(Preparation of Thermosetting Powder Coating Composition)

A thermosetting powder coating composition was obtained in the same manner as in Example 3, except that the substance containing the heptyl alcohol adduct (c1) of a styrene/maleic anhydride copolymer and containing the unreacted heptyl alcohol was used in an amount of 17 parts.

The parameters for designing, the property values of the resulting thermosetting powder coating composition, etc. are all set forth in Table 3.

Evaluations of the thermosetting powder coating compositions obtained in the above examples were carried out as follows. Each composition was electrostatically sprayed by corona electrical charging onto a undercoated steel panel in such a manner that the average film thickness of the resulting coating film after baking and curing became around 70 μm, and then the sprayed composition was baked for 30 minutes at a temperature shown in Table 4 to complete a cross-linked cured film.

The undercoated steel panel used herein was prepared by applying a solvent-borne black paint of polyester-melamine curing type in a thickness of 20 microns and then baking the black paint at 170° C. for 30 minutes onto an electrodeposited steel panel of 0.8 mm thickness having been subjected to zinc phosphate treatment.

The properties of the thermosetting powder coating compositions and the evaluation results of the baked cross-linked cured films are set forth in Table 4.

Evaluation methods are as follows.

Blocking or Coagulation Tendency

The blocking or coagulation tendency of the powder coating under storage was evaluated in the following manner.

In a cylindrical container having an inner diameter of 20 mm and a height of 80 mm, 6.0 g of the powder coating was placed, followed by closing the container. After the powder coating was stored for 7 days at 30° C., it was taken out of the container and touched with a finger to evaluate coagulation tendency based on the following criteria (AA to CC).

The evaluation results are set forth in Table 4.

AA: There is no coagulation.

BB: Although there is slight coagulation, coagulated particles are easily broken by touch with a finger.

CC: There are coagulated particles which are not broken by touch with a finger.

Gloss Value

By the use of a glossmeter manufactured by BYK Gardener, a 60° gloss value was measured.

Pencil Hardness

The pencil hardness was evaluated by a pencil scratch test (in accordance with JIS K5400 6.14).

Scratch/Mar Resistance

An aqueous slurry containing an abrasive of fixed grain size and having a concentration of 60% was applied onto the coating film in an amount of 2500 g based on 1 $m^2$. Then, by the use of a crackmeter (NR-100 manufactured by Daiei Kagaku K.K.), rubbing treatment of 20 reciprocation motions was carried out under application of a normal load of 65g/$cm^2$ onto the contact gauze surface. Then, a retention ratio (%) of 20° gloss after the rubbing was calculated.

Acid Resistance

On the film surface, 1 cc of sulfuric acid of 10% by volume was dropped, and the film was allowed to stand for 1 day. Then, the drop of sulfuric acid was wiped off, and the film appearance was observed and evaluated based on the following criteria (AA to CC).

AA: No traces are observed.

BB: Traces are slightly observed.

CC: Traces are clearly observed.

Solvent Resistance

The film surface was rubbed with gauze impregnated with xylene back and forth 50 times. Then, the film was observed and evaluated based on the following criteria (AA to CC).

AA: No traces are observed.

BB: Traces are slightly observed.

CC: Traces are clearly observed.

TABLE 1

(Preparation example of glycidyl group-containing acrylic resin (A))

| Composition ratio (part(s) by weight) | | Glycidyl-functional acrylic resin (A) | |
|---|---|---|---|
| | | (a1) | (a2) |
| Glycidyl group-containing monomer (a) | Glycidyl methcrylate | 40 | |
| | β-Methylglycidyl methacrylate | | 32 |
| Selectable other monomers | Styrene | 20 | 15 |
| | Methyl methacrylate | 35 | 35 |

TABLE 1-continued (Preparation example of glycidyl group-containing acrylic resin (A))

| Composition ratio (part(s) by weight) | | Glycidyl-functional acrylic resin (A) | |
|---|---|---|---|
| | | (a1) | (a2) |
| (b) | Normal butyl methacrylate | 5 | 18 |
| Polymerization initiator | t-Butyl peroxy-2-ethylhexanoate | 6.5 | 5.0 |
| Properties of (A) | Measured Tg | 49 | 48 |
| | Measured Mw | 4950 | 7100 |
| | Measured EEQ | 366 | 501 |

TABLE 2

(Preparation example of substance containing alcohol adduct (C) of styrene/maleic anhydride copolymer, and preparation example of masterbatch curative (B'))

| Composition ratio (part(s) by weight) | | Preparation example of substance containing alcohol adduct (C) of styrene/maleic anhydride copolymer | | | | |
|---|---|---|---|---|---|---|
| | | Prep. Ex. (c1) | Prep. Ex. (c2) | Prep. Ex. (c3) | Prep. Ex. (c4) | Prep. Ex. (c5) |
| Styrene/maleic anhydride copolymer | Number-average molecular weight Mn | 1110 | 1754 | 1110 | 9500 | 1754 |
| | Used Amount | 50 | 50 | 50 | 50 | 50 |
| Mono-hydric alcohols | Heptyl alcohol | 50 | | | 48 | 37 |
| | 12-Hydroxystearic acid | | 95 | | | |
| | Eicosyl alcohol | | | 128 | | |
| Esterification catalyst | Dibutyltin oxide | | | | | 0.2 |
| Acid anhydride group/alcoholic hydroxyl group charge ratio (mol/mol) | | 1/2 | | | 1/2 | |
| Ratio of an alcohol addition reaction (% by IR measurement) | | 24.3 | 20.1 | 10.2 | 22.6 | 51.3 |
| Residual alcohol content in (C)-containing substance (wt %) | | 20 | 58 | 67 | 21 | 26 |

| Composition ratio (part(s) by weight) | | Masterbatch curative (B') Prep. Ex. (b'1) |
|---|---|---|
| Substance containing alcohol adduct (C) of styrene/maleic anhydride copolymer | (c1) | 15 |
| Polycarboxyl curative (B) | Dodecanedioic acid | 100 |
| Ratio of an alcohol addition reaction (% by IR measurement) | | 24.5 |
| Residual alcohol content in (C)-containing substance (wt %) | | 18 |

TABLE 3

(Example of thermosetting powder coating composition, parameters for designing thereof, and properties thereof)

| Formulation ratio (part(s) by weight) | | | Example of thermosetting powder coating composition | | | | | Comparative example of thermosetting powder coating composition | | | | | | |
|---|---|---|---|---|---|---|---|---|---|---|---|---|---|---|
| | | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
| Glycidyl group-containing acrylic resin (A) | (a1) | | 78 | 78 | 68 | | 78 | 78 | 68 | 78 | 78 | 68 | 78 | 68 |
| | (a2) | | | | | 37 | | | | | | | | |
| Polycarboxyl curative (B) | Dodecanedioic acid | | 22 | 22 | | | | 22 | | 22 | 22 | | 22 | |
| | Dodecanedioic acid linear polyacid anhydride "Albester 2230" | | | | 32 | 63 | | | 32 | | | 32 | | 32 |
| Substance containing alcohol adduct (C) of styrene/maleic anhydride copolymer, | Example | (c1) | 3 | | 3 | | | | | | | | | 17 |
| | | (c2) | | 5 | | 4 | | | | | | | | |
| | | (b'1) | | | | | 25 | | | | | | | |
| | Comparative example | SMA1000 | | | | | | | | 3 | | | | |
| | | (c3) | | | | | | | | | 4 | | | |
| | | (c4) | | | | | | | | | | 3 | | |
| | | (c5) | | | | | | | | | | | 4 | |

TABLE 3-continued (Example of thermosetting powder coating composition, parameters for designing thereof, and properties thereof)

| Formulation ratio (part(s) by weight) | | | Example of thermosetting powder coating composition | | | | | Comparative example of thermosetting powder coating composition | | | | | | |
|---|---|---|---|---|---|---|---|---|---|---|---|---|---|---|
| | | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
| or its masterbatch curative (B') | | | | | | | | | | | | | | |
| Other paint Additives | Titanium dioxide | R-960 | | | | 35 | | | | | | | | |
| | Carbon black | MA100 | | 3 | | | | | 3 | | | | | |
| | Ultraviolet light absorber | Tinuvin CGL1545 | | | 2.0 | | | | | | 2.0 | | | |
| | Light stabilizer | Tinuvin 144 | | | 1.0 | | | | | | 1.0 | | | |
| | Degassing agent | Benzoin | | | 0.5 | | | | | | 0.5 | | | |
| | Flow additive | i-BMA homopolymer | 0.7 | 0.7 | 0.7 | | 0.7 | 0.7 | 0.7 | 0.7 | 0.7 | 0.7 | 0.7 | 0.7 |
| | | "Resimix RL-4" | | | | 0.7 | | | | | | | | |
| | Curing catalyst | Tetrabutyl phosphonium bromide | | | 0.1 | | | | 0.1 | | | 0.1 | | 0.1 |
| (ac)/(ep) molar ratio | | | 0.9 | 0.9 | 1.05 | 0.75 | 0.9 | 0.9 | 1.05 | 0.9 | 0.9 | 1.05 | 0.9 | 1.05 |
| Volume average particle diameter of powder coating (μm) | | | 27 | 25 | 28 | 29 | 24 | 24 | 25 | 25 | 29 | 26 | 25 | 23 |

TABLE 4

(Coating properties of thermosetting powder coating composition, and properties of cross-linked cured film)

| Property value | | Example of thermosetting powder coating composition | | | | | Comparative example of thermosetting powder coating composition | | | | | | |
|---|---|---|---|---|---|---|---|---|---|---|---|---|---|
| | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
| Baking temperature | X° C./30 min | 150 | 150 | 150 | 170 | 150 | 150 | 150 | 150 | 150 | 150 | 150 | 150 |
| | Film thickness (μm) | 69 | 70 | 71 | 69 | 68 | 72 | 69 | 71 | 69 | 68 | 71 | 70 |
| Paint property | Blocking or coagulation tendency | BB | BB | CC-BB | AA | BB | BB | CC-BB | BB | BB | CC-BB | BB | CC-BB |
| Film properties | Gloss (60°) | 94 | 95 | 93 | 88 | 93 | 92 | 94 | 84 | 75 | 76 | 75 | 58 |
| | Pencil hardness | H-2H | H-2H | 2H | F | H-2H | H | H-2H | H | H | H | H-2H | H |
| | Scratch/mar resistance (%) | 25 | 29 | 37 | 22 | 27 | 10 | 15 | 11 | 18 | 20 | 33 | 29 |
| | Acid resistance | AA | AA | AA | BB | AA | BB | BB-AA | BB | BB-AA | BB-AA | BB-AA | BB |
| | Solvent resistance | AA | AA | AA | BB | AA | BB | BB-AA | BB | BB | BB-AA | BB-AA | AA |

What is claimed is:

1. A thermosetting powder coating composition comprising (A) a glycidyl group-containing acrylic resin obtained by (co)polymerizing monomers containing an ethylenically unsaturated monomer having a glycidyl group and/or a β-methylglycidyl group, (B) a polycarboxyl curative, and (C) an alcohol adduct of a styrene/maleic anhydride copolymer, and being capable of forming a cross-linked cured film having a 60° gloss value of not less than 80.

2. The thermosetting powder coating composition as claimed in claim 1, wherein (C) the alcohol adduct of a styrene/maleic anhydride copolymer is obtained by addition reaction of a styrene/maleic anhydride copolymer having a number-average molecular weight Mn of not more than 3000 with a monohydric alcohol of 1 to 18 carbon atoms.

3. The thermosetting powder coating composition as claimed in claim 2, wherein (C) the alcohol adduct of a styrene/maleic anhydride copolymer is an addition reaction product of a styrene/maleic anhydride copolymer having a number-average molecular weight Mn of not more than 3000 with a monohydric alcohol of 4 to 14 carbon atoms, and the monohydric alcohol is addition reacted in such an amount that the ratio of addition reaction represented by the following formula (1) becomes 5 to 50% based on the amount of acid anhydride group in the styrene/maleic anhydride copolymer, ratio of addition reaction (%)=[{($I_a/I'_a$)−($I_b/I'_b$)}/($I_a/I'_a$)]×100   (1)

wherein I is an infrared absorption intensity of the acid anhydride group at 1780 cm$^{-1}$, I' is an infrared absorption intensity at 2000 cm$^{-1}$ in the vicinity of the absorption peak, and characters a and b mean before the reaction and after the reaction, respectively.

4. The thermosetting powder coating composition as claimed in claim 1, wherein (C) the alcohol adduct of a styrene/maleic anhydride copolymer is contained in an amount of 0.3 to 15 parts by weight based on 100 parts by weight of the total of (A) the glycidyl group-containing acrylic resin and (B) the polycarboxyl curative.

5. The thermosetting powder coating composition as claimed in claim 1, wherein (C) the alcohol adduct of a styrene/maleic anhydride copolymer is contained in an amount of 0.3 to 5 parts by weight based on 100 parts by weight of the total of (A) the glycidyl group-containing acrylic resin and (B) the polycarboxyl curative.

6. The thermosetting powder coating composition as claimed in claim 1, wherein (C) the alcohol adduct of a styrene/maleic anhydride copolymer has been previously homogeneously mixed with (B) the polycarboxyl curative in a molten state.

7. The thermosetting powder coating composition as claimed in claim 1, wherein (A) the glycidyl group-containing acrylic resin is a copolymer obtained by copolymerizing copolymerizable monomers containing 10 to 60% by weight of glycidyl methacrylate and/or β-methylglycidyl methacrylate and 5 to 45% by weight of styrene, with the proviso that the total amount of all the copolymerizable monomers contained is 100% by weight, and (B) the polycarboxyl curative is at least one substance selected from aliphatic or alicyclic dibasic acids of 8 to 20 carbon atoms, acid anhydrides obtained by dehydrocondensation of the dibasic acids, and polyester resins having a carboxyl group as a main functional group which are solid at room temperature.

8. The thermosetting powder coating composition as claimed in claim 1, wherein (A) the glycidyl group-containing acrylic resin is a copolymer obtained by copolymerizing copolymerizable monomers containing 10 to 60% by weight of glycidyl methacrylate and/or β-methylglycidyl methacrylate and 5 to 45% by weight of styrene, with the proviso that the total amount of all the copolymerizable monomers contained is 100% by weight, and (B) the polycarboxyl curative is at least one substance selected from aliphatic or alicyclic dibasic acids of 8 to 20 carbon atoms and acid anhydrides obtained by dehydrocondensation of the dibasic acids.

9. The thermosetting powder coating composition as claimed in claim 1, wherein (C) the alcohol adduct of a styrene/maleic anhydride copolymer is an adduct obtained by addition reaction of the styrene/maleic anhydride copolymer having a number-average molecular weight Mn of not more than 3000 with the monohydric alcohol of 4 to 14 carbon atoms in such an amount that the ratio of addition reaction represented by the following formula (1) becomes 5 to 50% based on the amount of acid anhydride group in the styrene/maleic anhydride copolymer, and an unreacted monohydric alcohol may be present in said composition.

$$\text{ratio of addition reaction } (\%) = [\{(I_a/I'_a) - (I_b/I'_b)\}/(I_a/I'_a)] \times 100 \quad (1)$$

wherein I is an infrared absorption intensity of the acid anhydride group at 1780 cm$^{-1}$, I' is an infrared absorption intensity at 2000 cm$^{-1}$ in the vicinity of the absorption peak, and characters a and b mean before the reaction and after the reaction, respectively.

10. A cross-linked cured film obtained by thermal curing of a thermosetting powder coating composition comprising (A) a glycidyl group-containing acrylic resin obtained by (co)polymerizing monomers containing an ethylenically unsaturated monomer having a glycidyl group and/or a β-methylglycidyl group, (B) a polycarboxyl curative, and (C) an alcohol adduct of a styrene/maleic anhydride copolymer, and having a 60° gloss value of not less than 80.

11. A process for preparing a thermosetting powder coating composition comprising (A) a glycidyl group-containing acrylic resin obtained by (co)polymerizing monomers containing an ethylenically unsaturated monomer having a glycidyl group and/or a β-methylglycidyl group, (B) a polycarboxyl curative, and (C) an alcohol adduct of a styrene/maleic anhydride copolymer, comprising:

previously homogeneously mixing at least a part of (C) the alcohol adduct of a styrene/maleic anhydride copolymer with (B) the polycarboxyl curative in a molten state, and then mixing the resulting (B') masterbatch curative with (A) the glycidyl group-containing acrylic resin obtained by (co)polymerizing monomers containing an ethylenically unsaturated monomer having a glycidyl group and/or a β-methylglycidyl group, and the rest of (C) alcohol adduct of a styrene/maleic anhydride copolymer.

12. The thermosetting powder coating composition as claimed in claim 3, wherein (C) the alcohol adduct of a styrene/maleic anhydride copolymer is contained in an amount of 0.3 to 15 parts by weight based on 100 parts by weight of the total of (A) the glycidyl group-containing acrylic resin and (B) the polycarboxyl curative.

13. The thermosetting powder coating composition as claimed in claim 4, wherein (C) the alcohol adduct of a styrene/maleic anhydride copolymer is contained in an amount of 0.3 to 5 parts by weight based on 100 parts by weight of the total of (A) the glycidyl group-containing acrylic resin and (B) the polycarboxyl curative.

14. The thermosetting powder coating composition as claimed in claim 5, wherein (C) the alcohol adduct of a styrene/maleic anhydride copolymer has been previously homogeneously mixed with (B) the polycarboxyl curative in a molten state.

15. The thermosetting powder coating composition as claimed in claim 6, wherein (A) the glycidyl group-containing acrylic resin is a copolymer obtained by copolymerizing copolymerizable monomers containing 10 to 60% by weight of glycidyl methacrylate and/or β-methylglycidyl methacrylate and 5 to 45% by weight of styrene, with the proviso that the total amount of all the copolymerizable monomers contained is 100% by weight, and (B) the polycarboxyl curative is at least one substance selected from aliphatic or alicyclic dibasic acids of 8 to 20 carbon atoms, acid anhydrides obtained by dehydrocondensation of the dibasic acids, and polyester resins having a carboxyl group as a main functional group which are solid at room temperature.

16. The thermosetting powder coating composition as claimed in claim 7, wherein (A) the glycidyl group-containing acrylic resin is a copolymer obtained by copolymerizing copolymerizable monomers containing 10 to 60% by weight of glycidyl methacrylate and/or β-methylglycidyl methacrylate and 5 to 45% by weight of styrene, with the proviso that the total amount of all the copolymerizable monomers contained is 100% by weight, and (B) the polycarboxyl curative is at least one substance selected from aliphatic or alicyclic dibasic acids of 8 to 20 carbon atoms and acid anhydrides obtained by dehydrocondensation of the dibasic acids.

17. The thermosetting powder coating composition as claimed in claim 8, wherein (C) the alcohol adduct of a styrene/maleic anhydride copolymer is an adduct obtained by addition reaction of the styrene/maleic anhydride copolymer having a number-average molecular weight Mn of not more than 3000 with the monohydric alcohol of 4 to 14 carbon atoms in such an amount that the ratio of addition reaction represented by the following formula (1) becomes 5 to 50% based on the amount of acid anhydride group in the styrene/maleic anhydride copolymer, and an unreacted monohydric alcohol may be present in said composition.

$$\text{ratio of addition reaction } (\%) = [\{(I_a/I'_a) - (I_b/I'_b)\}/(I_a/I'_a)] \times 100 \quad (1)$$

wherein I is an infrared absorption intensity of the acid anhydride group at 1780 cm$^{-1}$, I' is an infrared absorption intensity at 2000 cm$^{-1}$ in the vicinity of the absorption peak, and characters a and b mean before the reaction and after the reaction, respectively.

\* \* \* \* \*